United States Patent
Zhang et al.

(10) Patent No.: US 11,812,487 B2
(45) Date of Patent: Nov. 7, 2023

(54) METHOD, DEVICE, EXTENDER, AND COMPUTER MEDIUM FOR AUTOMATICALLY RESTORING CONNECTION

(71) Applicant: ARRIS Enterprises LLC, Suwanee, GA (US)

(72) Inventors: Yu Zhang, Guangdong (CN); Lidan Chen, Guangdong (CN); Ruilu Zeng, Guangdong (CN); Ju Li, Guangdong (CN); Bo Chen, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 89 days.

(21) Appl. No.: 17/514,149

(22) Filed: Oct. 29, 2021

(65) Prior Publication Data

US 2022/0159769 A1    May 19, 2022

(30) Foreign Application Priority Data

Nov. 13, 2020 (CN) .......................... 202011268389.X (51) Int. Cl.
*H04W 76/19* (2018.01)
*H04W 76/18* (2018.01)
(Continued)

(52) U.S. Cl.
CPC ............. *H04W 76/19* (2018.02); *H04L 43/16* (2013.01); *H04L 69/16* (2013.01); *H04W 76/18* (2018.02); *H04W 84/12* (2013.01)

(58) Field of Classification Search
None
See application file for complete search history.

(56) References Cited

U.S. PATENT DOCUMENTS

| 9,936,059 B2 * | 4/2018 | Gorajala Chandra ...................... H04W 72/29 |
| 2006/0182036 A1 * | 8/2006 | Sasagawa ................. H04L 1/24 370/242 |

(Continued)

FOREIGN PATENT DOCUMENTS

| CN | 201611146224 | * | 5/2017 |
| JP | 2010016480 A | * | 1/2010 |
| JP | 2012-98906 |  | 5/2012 |

OTHER PUBLICATIONS

Author Unknown, MQTT Version 5.0, pp. 1-137, Mar. 7 (Year: 2019).*

(Continued)

*Primary Examiner* — Christopher M Crutchfield
(74) *Attorney, Agent, or Firm* — Wenderoth, Lind & Ponack, L.L.P.

(57) ABSTRACT

The present disclosure relates to a method, a device, an extender, and a computer medium for automatically restoring connections. In this method, a wireless extender records the number of packets received from an access point within a first predetermined time; the wireless extender compares the recorded number with a predetermined threshold; and in response to determining that the recorded number is smaller than the predetermined threshold, the wireless extender restarts a WiFi module used for WiFi communication in the wireless extender to reestablish a WiFi connection with the access point. By automatically detecting the WiFi connection status and automatically triggering the restart of the WiFi module, it is possible to attempt to restore the WiFi connection without manual intervention, thereby improving the efficiency of network restoration.

20 Claims, 5 Drawing Sheets

(51) Int. Cl.
*H04L 43/16* (2022.01)
*H04L 69/16* (2022.01)
*H04W 84/12* (2009.01)

(56) References Cited

U.S. PATENT DOCUMENTS

| | | |
|---|---|---|
| 2016/0066361 A1 | 3/2016 | Ogawa et al. |
| 2016/0262163 A1* | 9/2016 | Gonzalez Garrido ........................ H04W 52/50 |
| 2017/0111854 A1* | 4/2017 | Ho ........................... H04B 7/14 |
| 2018/0270050 A1 | 9/2018 | Ohtani et al. |
| 2019/0266055 A1* | 8/2019 | Grau ................... H04L 43/0805 |
| 2020/0136975 A1* | 4/2020 | Arora .................... H04L 43/045 |
| 2021/0219373 A1* | 7/2021 | Moon ................... H04W 76/30 |
| 2022/0239569 A1* | 7/2022 | Wu ....................... H04L 41/046 |

OTHER PUBLICATIONS

International Search Report and the Written Opinion of the International Searching Authority dated Feb. 14, 2022 in International (PCT) Application No. PCT/US2021/057220.

International Preliminary Report on Patentability and Written Opinion dated May 25, 2023 in International Application No. PCT/US2021/057220.

* cited by examiner

| S510 | The wireless extender records the number of packets received from the access point within a first predetermined time |

↓

| S520 | The wireless extender compares the recorded number with a predetermined threshold |

↓

| S530 | In response to determining that the recorded number is smaller than the predetermined threshold, the wireless extender restarts the WiFi module to reestablish a WiFi connection with the access point |

| S610 | The wireless extender determines whether the MQTT client hosted in the wireless extender receives an MQTT PINGRESP packet from the MQTT broker hosted in the access point |

| S620 | In response to determining that the MQTT PINGRESP packet is not received, the wireless extender restarts the MQTT client to reestablish an MQTT connection with the MQTT broker in a case where the MQTT client cannot restore the MQTT connection with the MQTT broker |

METHOD, DEVICE, EXTENDER, AND COMPUTER MEDIUM FOR AUTOMATICALLY RESTORING CONNECTION

TECHNICAL FIELD

The present disclosure relates to the field of wireless local area networks, and more specifically, to a method, a device, an extender, and a computer medium for automatically restoring connections in the field of wireless local area networks.

BACKGROUND ART

In a wireless local area network, a user terminal can connect to an access point through a protocol in the 802.11 protocol suite, for example, connect through WiFi (Wireless Fidelity). A wireless extender is introduced in order to enable the access point to cover a range as large as possible and to enable the access point to be accessed by more user terminals. The wireless extender can establish a WiFi connection (may also be referred to as a WiFi Backhaul connection) with the access point through the WiFi protocol, and can establish a WiFi connection with the user terminal through the WiFi protocol. This allows the user terminal to connect to the access point via the wireless extender. The wireless extender can amplify and forward a wireless signal transmitted between an access point and a user terminal, so as to avoid user terminals that are far away from the access point from being unable to communicate with the access point.

An MQTT (Message Queuing Telemetry Transport) client can be hosted in the wireless extender. The MQTT client can communicate with other MQTT clients or MQTT servers in a network via an MQTT broker hosted in the access point to transmit desired messages based on a publish/subscribe mode. An MQTT connection can be established between the MQTT client of the wireless extender and the MQTT broker of the access point through the MQTT protocol. In the MQTT connection, the MQTT client of the wireless extender can send collected status information, channel information and the like of the wireless extender and the user terminal to the MQTT broker of the access point. The MQTT broker of the access point can send the received information to a cloud server for analysis and network optimization. In addition, the MQTT broker of the access point can send data for optimizing the configuration of the wireless extender and/or controlling the operation of the wireless extender received from the cloud server to the MQTT client of the wireless extender to achieve the performance improvement of the wireless extender.

In some cases, the wireless extender may lose the WiFi connection with the access point. In this case, the user terminal connected to the wireless extender will find that network communication is not possible. When it is determined that this is caused by the connection failure of the wireless extender, the wireless extender will be manually restarted to attempt to restore the WiFi connection.

In addition, although sometimes the WiFi connection between the wireless extender and the access point is normal, the cloud server side cannot receive the status information from the wireless extender and/or cannot send the configuration information and the like of the wireless extender to the wireless extender. In this case, it can be determined that there is problem in the MQTT connection. Although the MQTT protocol has a mechanism to restore the MQTT connection, the mechanism may still be unable to restore the MQTT connection, for example, the MQTT client itself crashes. Therefore, it is still necessary to manually restart the wireless extender to reestablish the MQTT connection.

As a result, manual involvement is often required to manually restart the wireless extender in restoring a connection failure on the wireless extender. This significantly reduces the efficiency of failure recovery and affects the performance of network service. Therefore, it is desirable to provide a way to avoid manual involvement in the process of restoring the connection.

SUMMARY OF THE INVENTION

Some aspects of the present disclosure relate to a wireless extender. The wireless extender may include: a memory, in which an instruction is stored; and a processor, configured to execute the instruction stored in the memory to cause the wireless extender to execute the following operations. The operations may include: recording the number of packets received from an access point within a first predetermined time; comparing the recorded number with a predetermined threshold; and in response to determining that the recorded number is smaller than the predetermined threshold, restarting a WiFi module used for WiFi communication in the wireless extender to reestablish a WiFi connection with the access point.

In some embodiments, in the process of restarting the WiFi module, a controller in the wireless extender may send a control signal to the WiFi module to cause the WiFi module to restart after resetting.

In some embodiments, if the WiFi connection cannot be reestablished, the wireless extender may be restarted to cause the wireless extender to re-execute its entire workflow.

In some embodiments, the wireless extender may further execute the following operations: in response to determining that the recorded number is not smaller than the predetermined threshold, or determining that the WiFi connection has been reestablished, determining whether an MQTT client hosted in the wireless extender receives an MQTT PINGRESP packet from an MQTT broker hosted in the access point within a second predetermined time; and in response to determining that the MQTT PINGRESP packet is not received, restarting the MQTT client to reestablish an MQTT connection with the MQTT broker in a case where the MQTT client cannot restore the MQTT connection with the MQTT broker.

In some embodiments, in the process of restarting the MQTT client, the controller in the wireless extender may delete a currently running MQTT client process and call a new MQTT client process.

In some embodiments, if the MQTT connection cannot be reestablished, the wireless extender may be restarted to cause the wireless extender to re-execute its entire workflow.

In some embodiments, before the wireless extender is restarted, a user terminal connected to the wireless extender may be switched to an access point which is performing network communication.

Other aspects of the present disclosure relate to a method, a device, and a non-transitory computer-readable medium for automatically restoring connections. They can all implement the operations that can be executed by the wireless extender.

BRIEF DESCRIPTION OF THE DRAWINGS

For a better understanding of the present disclosure and to show how to implement the present disclosure, examples are herein described with reference to the attached drawings, wherein.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is limited by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
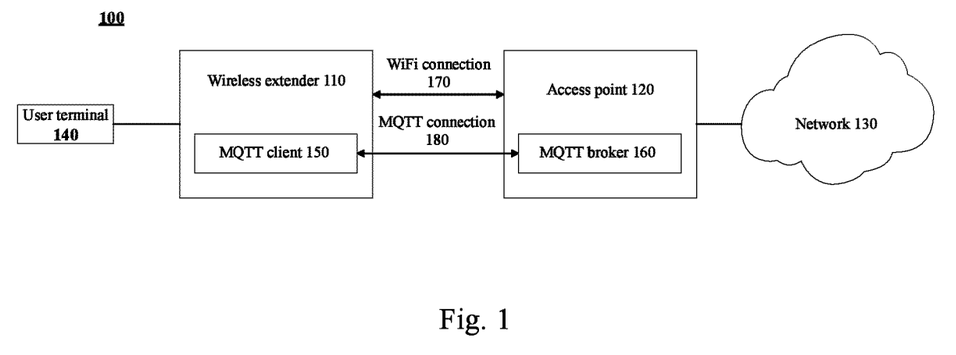
FIG. 1 is a schematic diagram of a wireless network in which a wireless extender and an access point are connected according to an embodiment of the present disclosure.

First, referring to FIG. 1, which is a schematic diagram of a wireless network 100 in which a wireless extender 110 and an access point 120 are connected according to an embodiment of the present disclosure.

One or more user terminals 140 are connected to the access point 120 via the wireless extender 110, and then connected to a network 130 via the access point 120. A WiFi connection 170 is established between the wireless extender 110 and the access point 120, and the user terminal 140 can enjoy network services from the network 130 through the WiFi connection 170. If the WiFi connection 170 fails, the user terminal 140 can no longer surf the Internet. The wireless extender 110 may include not only a signal repeater in a wireless local area network, but also any access device capable of establishing a WiFi connection with an access point for the access of one or more user terminals. The access point in the present specification may also be referred to as a gateway device, which enables a user terminal to communicate with servers and terminals on various networks such as the Internet, cellular networks, Internet, metropolitan area networks, and wide area networks.

An MQTT client 150 may be hosted in the wireless extender 110. In this case, a program code corresponding to the MQTT client 150 may be stored in a memory of the wireless extender 110. The MQTT client 150 may be a separate functional module, or may be a part of other functional modules. An MQTT broker 160 may be hosted in the access point 120. In this case, a program code corresponding to the MQTT broker 160 may be stored in a memory of the access point 120. The MQTT broker 160 may be a separate functional module, or may be a part of other functional modules. For example, in CommScope's HAv3 (Home Assure version 3) system, the MQTT client 150 may be integrated in an HAv3 embedded agent in the wireless extender 110. The HAv3 embedded agent can collect data of the extender 110 and the user terminal 140, and send the data to an HAv3 controller integrated with the MQTT broker 160 running in the access point 120 via the MQTT protocol. Then, the HAv3 controller can send these data to a cloud server for analysis and network optimization. Of course, the collection and transmission of these data can also be performed by a separate MQTT client 150 and a separate MQTT broker 160.

The communication between the MQTT client 150 and the MQTT broker 160 needs to be via an MQTT connection 180. Through the MQTT connection 180, the MQTT client 150 can report the status information, channel information and the like of the wireless extender 110 and/or the user terminal 140 to the MQTT broker 160 and the network side, and the MQTT broker 160 and the network side can send control information for managing the wireless extender to the MQTT client 150 to optimize its configuration and the like. After the WiFi connection 170 is established between the wireless extender 110 and the access point 120, the MQTT connection 180 may be established between the wireless extender 110 and the access point 120.

The wireless extender 110 such as a WiFi extender may relay WiFi wireless signals interacting between the user terminal 140 and the access point 120. It may have an exemplary configuration block diagram as shown in FIG. 2.

Although it is referred to as a wireless extender in the present specification, the wireless extender 110 may be, for example, a hardware electronic device that can combine the functions of a modem, a repeater, and an access device. The present disclosure further proposes that the wireless extender 110 may include, but is not limited to, functions of a smart media device (SMD) or an IP/QAM set top box (STB) that can decode audio/video contents and play contents provided by OTT or MSO.

Figure 2:
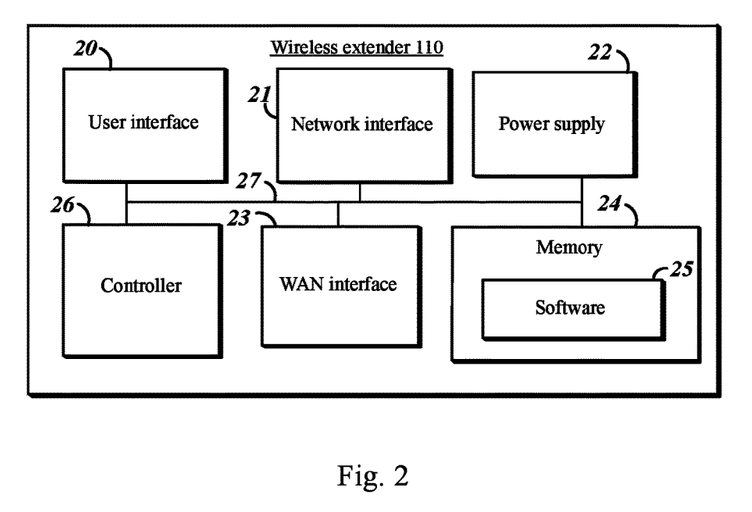
FIG. 2 is an exemplary configuration block diagram of the wireless extender according to an embodiment of the present disclosure.

As shown in FIG. 2, the wireless extender 110 includes a user interface 20, a network interface (for example, a LAN interface) 21, a power supply 22, a WAN interface 23, a memory 24, and a controller 26. The user interface 20 may include, but is not limited to, a button, a keyboard, a keypad, LCD, CRT, TFT, LED, HD or other similar display devices, including a display device with a touch screen capability that enables interaction between a user and the wireless extender 110. The network interface 21 may comprise various types of network cards and circuit systems implemented by software and/or hardware so as to be able to communicate with an access point and a client device using one or more wireless protocols. The wireless protocol is, for example, any IEEE 802.11 Wi-Fi protocol, Bluetooth protocol, Bluetooth Low Energy (BLE) or other short-distance protocols operated in accordance with wireless technology standards to use any licensed or unlicensed frequency band (for example, the Citizen Broadband Radio Service (CBRS) band, 2.4 GHz band, 5 GHz band, or 6 GHz band), RF4CE protocol, ZigBee protocol, Z-Wave protocol, or IEEE 802.15.4 protocol to exchange data over a short distance. The wireless extender 110, as a kind of client devices, may connect to the access point by using any of the above-mentioned protocols to establish underlying physical communication links. Based on the established physical communication links, the wireless extender 110 can further establish an application layer connection with the access point by using a corresponding application layer protocol, e.g. the MQTT connection by using the MQTT protocol as described with reference to FIG. 1.

The power supply 22 supplies power to internal components of the wireless extender 110 through an internal bus 27. The power supply 22 may be a self-contained power source such as a battery pack, and it has an interface which is powered by (for example, directly or through other devices) an electrical charger connected to a socket. The power supply 22 may further include a rechargeable battery that is detachable for replacement, for example, NiCd, NiMH, Li ion or Li polymer battery. If the wireless extender 110 is a modem or has gateway capabilities, it may include a WAN interface 23, which may include various network cards and circuits implemented in software and/or hardware to achieve communication with Internet service providers or multiple systems operators (MSOs).

The memory 24 includes a single memory or one or more memories or storage locations, including but not limited to a random access memory (RAM), a dynamic random access memory (DRAM), a static random access memory (SRAM), a read-only memory (ROM), EPROM, EEPROM, ROM, a flash memory, FPGA logic block, a hard disk, or any other layers of a memory hierarchy. The memory 24 may be used to store any type of instructions, software or algorithms, including software 25 for controlling general functions and operations of the wireless extender 110.

The controller 26 controls the general operations of the extender 110 and executes the administrative functions related to other devices in the network (for example, extenders and client devices). The controller 26 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the wireless extender 110 according to the embodiments described in the present disclosure. The processor 26 may include various implementations of a digital circuit system, an analog circuit system, or a mixed signal (combination of analog and digital) circuit system that executes functions in a computing system. The controller 26 may comprise, for example, a circuit such as an integrated circuit (IC), a portion or circuit of a separate processor core, an entire processor core, a separate processor, a programmable hardware device such as a field programmable gate array (FPGA), and/or a system comprising a plurality of processors.

The internal bus 27 may be used to establish communication between the components of the wireless extender 110 (for example, 20 to 22, 24, and 26).

Returning to FIG. 1, when the WiFi connection 170 fails, the user terminal 140 will find that it can no longer surf the Internet. When the WiFi connection 170 is normal while the MQTT connection 180 fails, although the user terminal 140 can surf the Internet normally, the MQTT broker 160 and the like may not be able to exchange status information, configuration information, etc. with the MQTT client 150. This will affect the monitoring of the network status and affect the immediate optimization of the network.

In conventional technologies, the wireless extender is usually restarted manually after a connection failure is discovered. However, manual intervention is undesirable. According to a method of the embodiments of the present disclosure, it is possible to automatically detect the connection status and automatically trigger a failure repair operation in response to the detection result, thereby improving the efficiency of restoring the connection.

Figure 3:
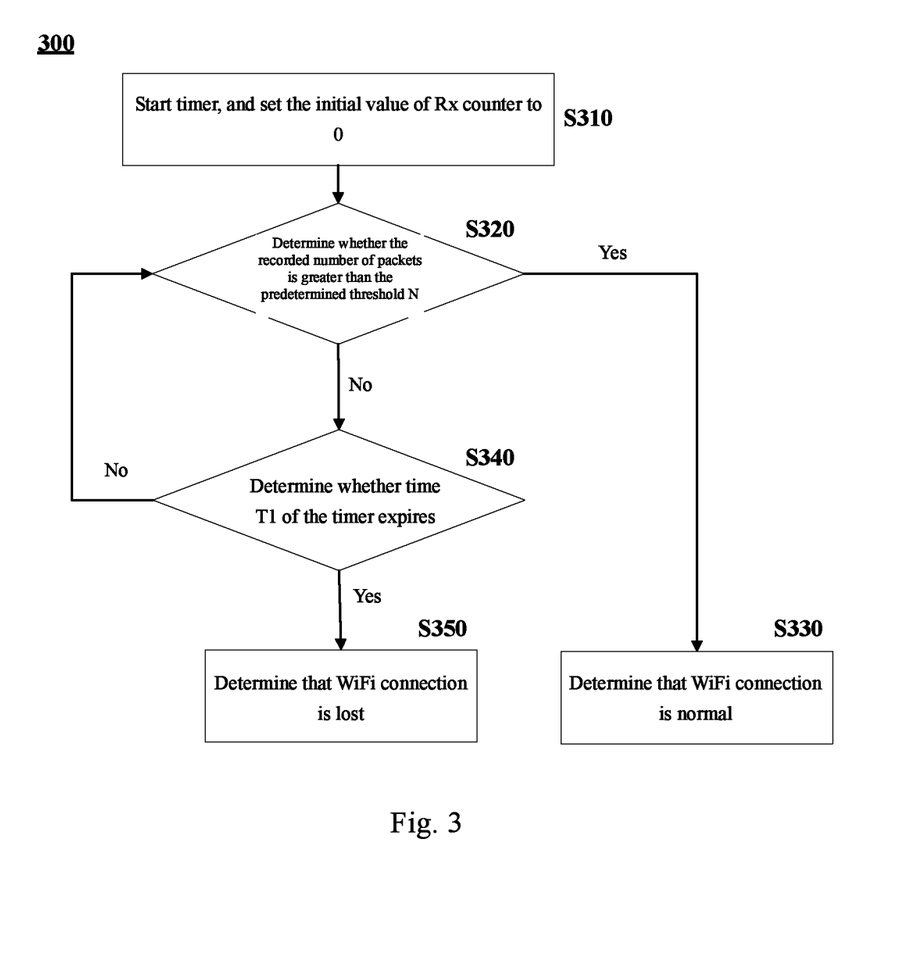
FIG. 3 is a flowchart of a method for detecting a WiFi connection status according to an embodiment of the present disclosure.

Next, description will be made to a method as to how to automatically detect the WiFi connection status and the MQTT connection status to find failures with reference to FIG. 3 and FIG. 4 respectively.

In a method 300 for automatically detecting a WiFi connection status in FIG. 3, a counter (hereinafter may also be referred to as an Rx counter) may be set for an interface (for example, bSTA interface) of the wireless extender 110 that communicates with the access point 120 to record the number of packets received by the wireless extender 110 from the access point 120. The access point 120 may send packets that need to be forwarded to the user terminal 140 to the wireless extender 110, and may also send packets used for the wireless extender 110 itself to the wireless extender 110, such as packets used for management, control, and query purposes. No matter what kind of packets they are, the number of the packets can be recorded by the counter.

In S310, a timer is started, and the initial value of the Rx counter is set to 0. Time T1 of the timer indicates an interval of detecting the reading of the Rx counter, and the Rx counter may be set for the bSTA interface of the wireless extender 110.

In S320, the reception of packets from the access point 120 by the wireless extender 110 is monitored such that whenever a packet is received from the bSTA interface of the wireless extender 110, the reading of the Rx counter is increased by 1, and it is determined whether the reading of the Rx reader is greater than a predetermined threshold N.

If the reading of the Rx counter is greater than N, the method 300 proceeds to S330, otherwise the method 300 proceeds to S340.

In S330, it is determined that the WiFi connection is normal.

In S340, it is determined whether the time T1 expires. For example, it is determined whether the waiting time from the start of the timer is greater than T1.

If the time T1 of the timer expires, the method 300 proceeds to S350, otherwise the method returns to S320.

In S350, it is determined that the WiFi connection is lost. In other words, if the number of packets received by the wireless extender 110 from the access point 120 within the predetermined time T1 is smaller than the threshold N, it is determined that the WiFi connection has failed.

Figure 4:
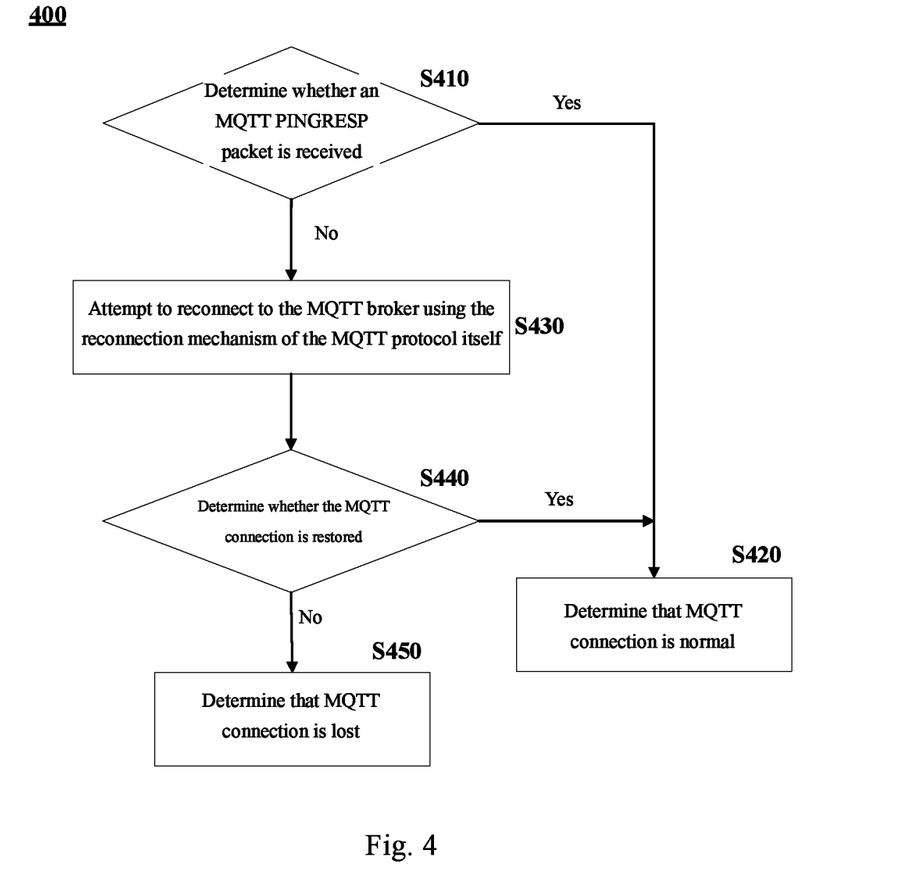
FIG. 4 is a flowchart of a method for detecting an MQTT connection status according to an embodiment of the present disclosure.

In a method 400 for automatically detecting an MQTT connection status in FIG. 4, a result of the joint implementation of the heartbeat mechanism and the reconnection mechanism in the MQTT protocol is fully utilized to help the determination of the status of the MQTT connection.

In S410, the MQTT client 150 determines whether an MQTT PINGRESP packet is received from the MQTT broker 160 within a predetermined multiple of a keep-alive interval. For example, after the MQTT client 150 sends an MQTT PINGREQ packet to the MQTT broker 160, the MQTT client 150 determines whether an MQTT PIN- GRESP packet in response to the MQTT PINGREQ packet is received within 1.5 times the keep-alive interval.

If an MQTT PINGRESP packet is received, the method 400 proceeds to S420, otherwise it proceeds to S430.

In S420, it is determined that the MQTT connection 180 between the MQTT client 150 and the MQTT broker 160 is normal.

In S430, the MQTT client 150 uses the reconnection mechanism of the MQTT protocol itself to attempt to be reconnected to the MQTT broker 160.

In S440, it is determined whether the MQTT connection is restored.

If it is determined that the MQTT connection is restored, the method 400 proceeds to S420, otherwise it proceeds to S450.

In S450, it is determined that the MQTT connection is lost.

After the connection failure is automatically detected, the embodiments of the present disclosure can automatically perform failure recovery based on the result of the automatic detection, thereby avoiding manual intervention and improving the recovery efficiency.

Figure 5:
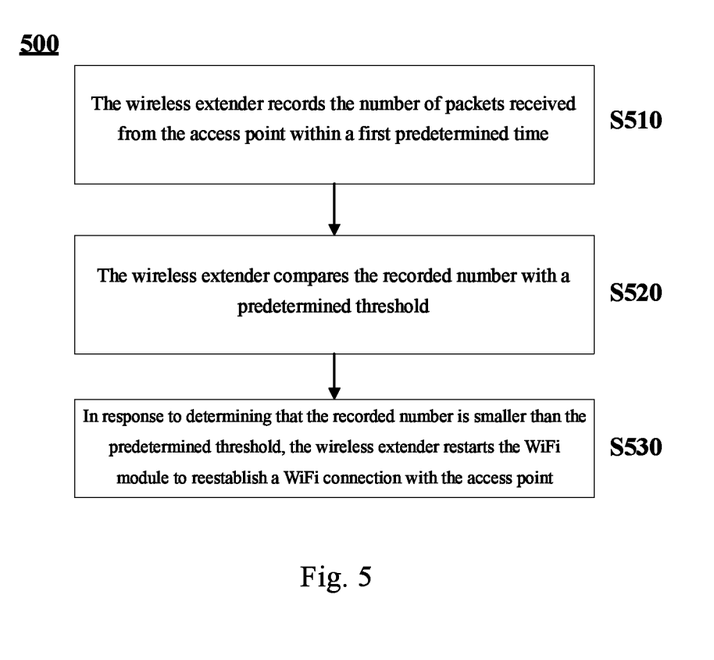
FIG. 5 is a flowchart of a method for automatically restoring a WiFi connection according to an embodiment of the present disclosure.

FIG. 5 is a flowchart showing a method 500 for automatically restoring a WiFi connection according to an embodiment of the present disclosure. The method 500 may be executed by the wireless extender 110 in FIG. 1, and the way of detecting a WiFi connection failure in the method 500 may be the same as that in the method 300 described above.

In S510, a wireless extender records the number of packets received from an access point within a first predetermined time.

For example, the wireless extender 110 may set an Rx counter for an interface through which the wireless extender communicates with the access point 120, and record the number of packets received from the access point 120 within a predetermined time such as 1 minute, 2 minutes, 5 minutes, and 10 minutes through the counter. The packets received by the wireless extender 110 from the access point 120 may include packets sent by the access point 120 to the user terminal 140, and may also include packets sent by the access point 120 to the wireless extender 110 for controlling or managing the wireless extender 110 and the like for the interaction with the wireless extender 110.

In S520, the wireless extender compares the recorded number with the predetermined threshold.

For example, the wireless extender 110 may count an average value of the number of packets destined for the wireless extender 110 received from the access point 120 within the aforementioned predetermined time, and use the average value as the threshold N. The wireless 110 may also set a predetermined multiple (for example, 2 times, 3 times, etc.) of the counted minimum number of packets destined for the wireless extender 110 received within the aforementioned predetermined time as the threshold N.

When the aforementioned first predetermined time expires, the wireless extender 110 compares the number of packets recorded in S510 with the threshold N.

In S530, in response to determining that the recorded number is smaller than the predetermined threshold, the wireless extender restarts a WiFi module used for WiFi communication in the wireless extender to reestablish the WiFi connection with the access point.

For example, if the number of packets recorded in S510 is not smaller than the threshold N, it can be determined that the WiFi connection between the wireless extender 110 and the access point 120 is normal. On the contrary, if the number of packets recorded in S510 is smaller than the threshold N, it can be determined that the WiFi connection between the wireless extender 110 and the access point 120 fails. Thus, by recording and comparing the number of packets, the WiFi connection status can be automatically detected.

After it is determined that the WiFi connection fails, the WiFi module used for WiFi communication in the wireless extender 110 may be automatically triggered to restart. The WiFi module may be a chip, a single-chip microcomputer or other integrated circuits specifically used for WiFi communication, and may also be a collection of program codes which implement WiFi-related protocols, or a combination of the two. Through the WiFi module, the wireless extender 110 can establish a WiFi connection with the access point 120, and can relay wireless signals between the access point 120 and the user terminal 140.

In the process of automatically triggering the restart of the WiFi module, the controller in the wireless extender 110 for controlling the entire operation of the wireless extender 110 may send a control signal to the WiFi module. Through the control signal, it is possible to first reset the WiFi module and then restart the WiFi module. For example, it is possible to send a reset signal to a pin for resetting of the WiFi module as a chip module, and then send a start signal to a pin for starting operations of the WiFi module to restart the WiFi module after resetting. For another example, it is possible to forcibly interrupt the execution of the WiFi module as a set of program codes, and then make the processor re-read the first code of the WiFi module to restart the execution of the set of program codes, so that the WiFi module is restarted after resetting. For further another example, when the WiFi module includes both a circuit part and a program code part, the controller may interrupt the current operation of the WiFi module through a control signal and restart the WiFi module to operate from the initial state. The restarted WiFi module will establish a WiFi connection with the access point. The process of establishment is the same as that in the related technology and will not be repeated here.

The wireless extender according to the embodiments of the present disclosure can automatically determine that a failure occurs in the WiFi connection by recording the number of packets received from the access point within a predetermined time and comparing the number with a threshold. In response to the determination result, the restart of the WiFi module in the wireless extender can be automatically triggered to reestablish a WiFi connection, which avoids the need for manual intervention in the process of restoring the WiFi connection and improves the efficiency of failure recovery. In addition, since the target of the restart is the WiFi module in the wireless extender instead of the entire wireless extender in the conventional technology, it is possible to restore the WiFi connection in a shorter time, thereby further improving the efficiency of failure recovery.

If the WiFi module still cannot establish a WiFi connection with the access point through S530, the controller in the wireless extender can make the wireless extender re-execute the entire workflow of the wireless extender. In other words, in the case where it is still difficult to restore the WiFi connection, the entire wireless extender will be restarted, and the restart process can be automatically completed by the controller in the wireless extender. For example, when the controller detects that the WiFi connection is not successfully established after the WiFi module is restarted, the controller automatically terminates the current operation of the wireless extender and restarts the operation of the wireless extender.

Figure 6:
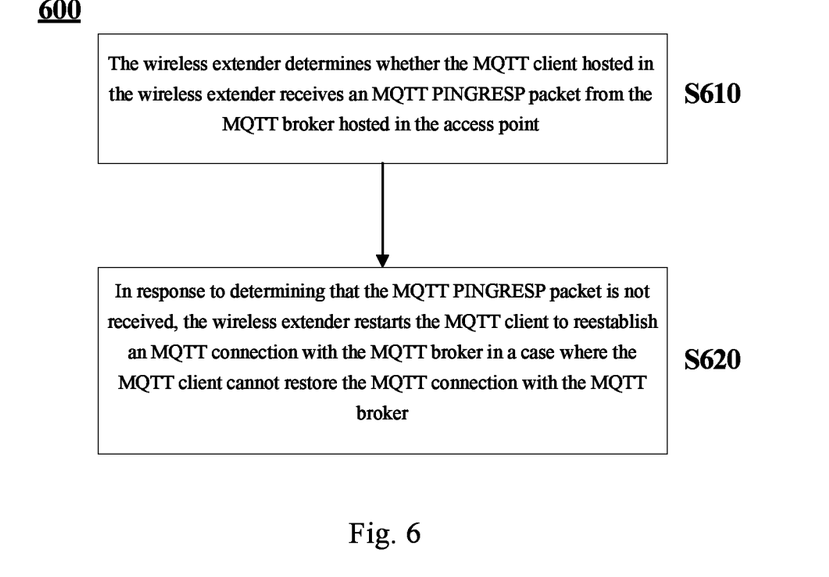
FIG. 6 is a flowchart of a method for automatically restoring an MQTT connection according to an embodiment of the present disclosure.

In the case where the WiFi connection is normal, the MQTT connection status can be further determined, and automatic restoration can be performed when there is an MQTT connection failure. A normal WiFi connection includes the following two conditions: one is that the number of packets recorded in S510 is not smaller than the threshold N, and the other is that the WiFi connection in S530 is reestablished. These two conditions may appear in one embodiment or in different embodiments. As long as any one of the conditions is met, a method 600 for automatically restoring an MQTT connection as shown in FIG. 6 may be executed when an MQTT connection failure is automatically detected. The method 600 may also be executed by the wireless extender 110, and the way of detecting the MQTT connection failure in the method 600 is the same as that in the method 400 described above.

In S610, a wireless extender determines whether an MQTT client hosted in the wireless extender receives an MQTT PINGRESP packet from an MQTT broker hosted in an access point within a second predetermined time.

For example, when the number of packets recorded within the first predetermined time in S510 is not smaller than the threshold N, the wireless extender may further detect whether the MQTT connection is normal. For another example, after the WiFi connection in S530 is reestablished, the wireless extender may further detect whether the MQTT connection is normal.

As described above, the MQTT client 150 hosted in the wireless extender 110 may send an MQTT PINGREQ packet to the MQTT broker 160 hosted in the access point 120 according to the heartbeat mechanism of the MQTT protocol. If the MQTT client 150 does not receive an MQTT PINGRESP packet from the MQTT broker 160 within a period of time such as 1.5 times of the keep-alive interval, it is determined that a failure occurs in the MQTT connection.

In S620, in response to determining that the MQTT PINGRESP packet is not received, the wireless extender restarts the MQTT client to reestablish an MQTT connection with the MQTT broker in a case where the MQTT client cannot restore the MQTT connection with the MQTT broker.

When the MQTT client 150 does not receive the MQTT PINGRESP packet, the MQTT client 150 may use the connection restoration mechanism of the MQTT protocol to try to restore the connection with the MQTT broker 160. However, it may be still difficult to restore the MQTT connection due to reasons of the MQTT client 150 itself (for example, client program crash, deadlock, etc.). In this case, the MQTT client may be restarted in the extender to reestablish the MQTT connection with the MQTT broker.

For example, the controller in the wireless extender may delete a currently running MQTT client process and call a new MQTT client process, so as to overcome the problem of being unable to restore the connection due to the original client failure by running a new MQTT client.

If the MQTT connection still cannot be restored after the MQTT client is restarted, for example, the MQTT connection still cannot be restored even by calling a new MQTT client process, then the entire wireless extender may need to be restarted. The restart process may be automatically completed by the controller in the wireless extender. For example, when the controller detects that the MQTT connection is not successfully established after calling a new MQTT client process, the controller automatically terminates the current operation of the wireless extender and restarts the operation of the wireless extender.

Regardless of whether the wireless extender is restarted when the WiFi connection cannot be restored or the MQTT connection cannot be restored, since the restart of the wireless extender will cause an interruption in the network service of the user terminal connected to the wireless extender, in order to avoid the interruption of the network service of the user terminal which affects the user experience, the user terminals connected to the wireless extender may be switched to an access point that is performing network communication before the wireless extender is restarted. In this way, these user terminals can continue to receive network services without being affected by the restart of the extender. For example, the user terminal may be switched to a frequency band of an access point connected to the Internet through band steering technology. For example, when the wireless extender 110 needs to be restarted, the user terminal 140 is switched to another channel of the access point 120, or the user terminal 140 is switched to a channel of another access point that is working, and then the extender 110 is restarted. During switching, the wireless extender 110 may send a message to the user terminal 140 requesting it to switch to another channel, and may also send to the user terminal 140 information of a destination to which the user terminal 140 is to be switched, so that the user terminal 140 can establish a connection with an access point that is working.

Figure 7:
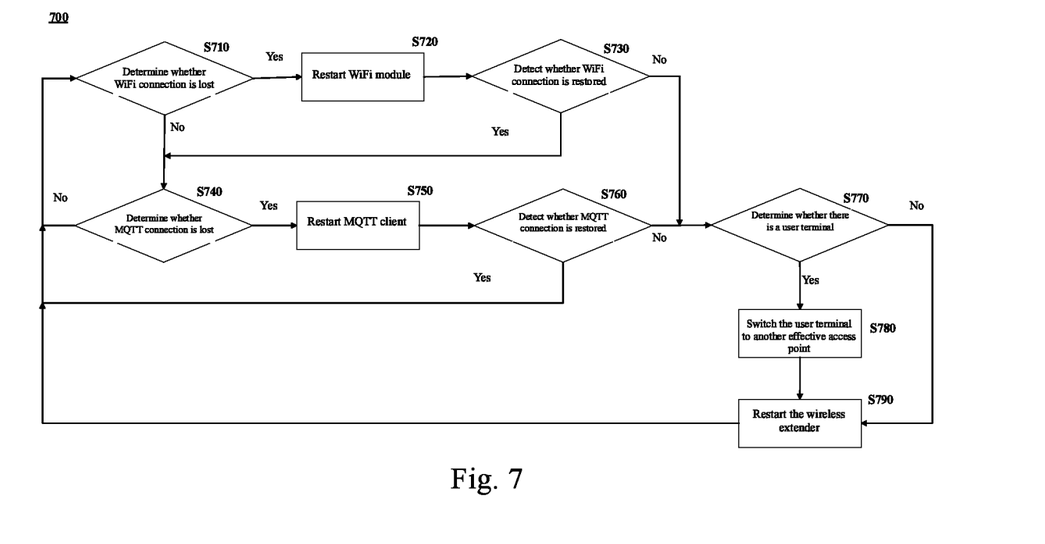
FIG. 7 is a flowchart of a method for automatically restoring a connection on a wireless extender according to an embodiment of the present disclosure.

FIG. 7 shows a flowchart of a method 700 for automatically restoring connections according to an embodiment of the present disclosure.

In S710, the wireless extender 110 detects the WiFi connection status to determine whether the WiFi connection is lost. The detection process may be as described in the method 300.

When it is detected that the WiFi connection is lost, the method 700 proceeds to S720, otherwise it proceeds to S740.

In S720, the wireless extender 110 restarts the WiFi module to reestablish the WiFi connection with the access point 120. Reference may be made to the description of S530 for the restart process.

In S730, the wireless extender 110 detects whether the WiFi connection is restored.

If the WiFi connection is restored, the method 700 proceeds to S740, otherwise it proceeds to S770.

In S740, the wireless extender 110 detects the MQTT connection status to determine whether the MQTT connection is lost. The detection process may be as described in the method 400.

When it is detected that the MQTT connection is lost, the method 700 proceeds to S750, otherwise it returns to S710 to continue to detect the connection status, thereby entering the next connection failure detection and recovery cycle.

In S750, the wireless extender 110 restarts the MQTT client to reestablish the MQTT connection with the access point 120. Reference may be made to the description of S620 for the restart process. Since the MQTT client may be integrated in a dedicated module such as the HAv3 embedded agent, the restart of the MQTT client may also be a restart of the dedicated module.

In S760, the wireless extender 110 detects whether the MQTT connection is restored.

If the MQTT connection is restored, the method 700 returns to S710, otherwise it proceeds to S770.

In S770, the wireless extender 110 determines whether there is a user terminal connected thereto.

If there is a user terminal connected to the wireless extender 110, the method 700 proceeds to S780, otherwise it proceeds to S790.

In S780, the wireless extender 110 switches the user terminal 140 connected thereto to another access point that is working.

In S790, the entire wireless extender 110 is restarted. Then, the method 700 may return to S710.

Through the execution of the method 700, it is possible not only to automatically detect the status of the WiFi connection and the MQTT connection but also to automatically trigger the failure recovery when a connection failure is detected. This avoids the manual intervention, thereby improving the efficiency of network restoration. In addition, by switching the user terminal to an access point capable of performing normal network communication, it is possible to prevent the user terminal from being affected by the restart of the extender, thereby improving user experience and enhancing network service performance.

Although the MQTT protocol as an application layer protocol is used as an example to describe how to detect and recover an application layer connection failure, for other application layer protocols with similar heartbeat mechanism and reconnection mechanism as the MQTT protocol, the above methods can also be used to detect and recover the corresponding application layer connection failure.

The present disclosure may be implemented as any combination of devices, systems, integrated circuits, and computer programs on non-transitory computer-readable media. One or a plurality of processors can be implemented as an integrated circuit (IC), an application specific integrated circuit (ASIC) or a large-scale integrated circuit (LSI), a system LSI, or a super LSI or super LSI component that performs part or all of the functions described in this disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or a plurality of memories may store software or algorithms by executable instructions, and one or a plurality of processors can associate the execution of a set of instructions of the software or algorithms to avoid the need for manual involvement in the process of restoring connections in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned implementation technologies may be used to complete the implementation of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. A wireless extender, comprising:
   a memory, in which an instruction is stored; and
   a processor, configured to execute the instruction stored in the memory to cause the wireless extender to execute the following operations:
     recording the number of packets received from an access point within a first predetermined time;
     comparing the recorded number with a predetermined threshold;
     in response to determining that the recorded number is smaller than the predetermined threshold, restarting a WiFi module used for WiFi communication in the wireless extender to reestablish a WiFi connection with the access point;
     in response to determining that the recorded number is not smaller than the predetermined threshold, or determining that the WiFi connection has been reestablished, determining whether a protocol client hosted in the wireless extender receives a response packet from a protocol broker hosted in the access point within a second predetermined time via a protocol; and in response to determining that the response packet is not received, restarting the protocol client to reestablish a connection based on the protocol with the protocol broker in a case where the protocol client cannot restore the connection with the protocol broker.

2. The wireless extender according to claim 1, wherein the processor is further configured to execute the instruction stored in the memory to cause the wireless extender to execute the following operation:
sending a control signal to the WiFi module to cause the WiFi module to restart after resetting.

3. The wireless extender according to claim 1, wherein the processor is further configured to execute the instruction stored in the memory to cause the wireless extender to execute the following operation:
restarting the wireless extender to cause the wireless extender to re-execute its entire workflow if the WiFi connection cannot be reestablished.

4. The wireless extender according to claim 1, wherein the protocol client is an MQTT client, the response packet is an MQTT PINGRESP packet, the protocol broker is an MQTT broker,
and the connection is an MQTT connection.

5. The wireless extender according to claim 4, wherein the processor is further configured to execute the instruction stored in the memory to cause the wireless extender to execute the following operation:
deleting a currently running MQTT client process and calling a new MQTT client process.

6. The wireless extender according to claim 4, wherein the processor is further configured to execute the instruction stored in the memory to cause the wireless extender to execute the following operation:
restarting the wireless extender to cause the wireless extender to re-execute its entire workflow if the MQTT connection cannot be reestablished.

7. The wireless extender according to claim 3 or 6, wherein the processor is further configured to execute the instruction stored in the memory to cause the wireless extender to execute the following operation:
before restarting the wireless extender, switching a user terminal connected to the wireless extender to an access point which is performing network communication.

8. A method for automatically restoring connections, comprising:
recording the number of packets received from an access point within a first predetermined time by a wireless extender;
comparing the recorded number with a predetermined threshold by the wireless extender;
in response to determining that the recorded number is smaller than the predetermined threshold, restarting by the wireless extender a WiFi module used for WiFi communication in the wireless extender to reestablish a WiFi connection with the access point;
in response to determining that the recorded number is not smaller than the predetermined threshold, or determining that the WiFi connection has been reestablished, determining whether a protocol client hosted in the wireless extender receives a response packet from a protocol broker hosted in the access point within a second predetermined time via a protocol; and
in response to determining that the response packet is not received, restarting the protocol client to reestablish a connection based on the protocol with the protocol broker in a case where the protocol client cannot restore the connection with the protocol broker.

9. The method according to claim 8, wherein restarting a WiFi module includes:
sending a control signal to the WiFi module by a controller in the wireless extender to cause the WiFi module to restart after resetting.

10. The method according to claim 8, further comprising:
restarting the wireless extender by a controller in the wireless extender to cause the wireless extender to re-execute its entire workflow if the WiFi connection cannot be reestablished.

11. The method according to claim 8,
wherein the protocol client is an MQTT client, the response packet is an MQTT PINGRESP packet, the protocol broker is an MQTT broker,
the connection is an MQTT connection.

12. The method according to claim 11, wherein restarting the MQTT client includes:
Deleting a currently running MQTT client process and calling a new MQTT client process by a controller in the wireless extender.

13. The method according to claim 11, further comprising:
restarting the wireless extender by the controller in the wireless extender to cause the wireless extender to re-execute its entire workflow if the MQTT connection cannot be reestablished.

14. The method according to claim 10, further comprising:
before restarting the wireless extender, switching by the wireless extender a user terminal connected to the wireless extender to an access point which is performing network communication.

15. A non-transitory computer-readable medium having an instruction stored therein, when executed by a processor, the instruction causing the processor to execute operations including the following:
recording the number of packets received from an access point within a first predetermined time;
comparing the recorded number with a predetermined threshold;
in response to determining that the recorded number is smaller than the predetermined threshold, restarting a WiFi module used for WiFi communication in the wireless extender to reestablish a WiFi connection with the access point;
in response to determining that the recorded number is not smaller than the predetermined threshold, or determining that the WiFi connection has been reestablished, determining whether a protocol client hosted in the wireless extender receives a response packet from a protocol broker hosted in the access point within a second predetermined time via a protocol; and
in response to determining that the response packet is not received, restarting the protocol client to reestablish a connection based on the protocol with the protocol broker in a case where the protocol client cannot restore the connection with the protocol broker.

16. The non-transitory computer-readable medium according to claim 15, wherein, when executed by the processor, the instruction causes the processor to further execute operations including the following:
sending a control signal to the WiFi module to cause the WiFi module to restart after resetting.

17. The non-transitory computer-readable medium according to claim 15, wherein the protocol client is an MQTT client, the response packet is an MQTT PINGRESP packet, the protocol broker is an MQTT broker, and the connection is an MQTT connection.

18. The non-transitory computer-readable medium according to claim 17, wherein, when executed by the processor, the instruction causes the processor to further execute operations including the following:

deleting a currently running MQTT client process and calling a new MQTT client process.

19. The non-transitory computer-readable medium according to claim 15, wherein, when executed by the processor, the instruction causes the processor to further execute operations including the following:

when the WiFi connection cannot be reestablished and the wireless extender needs to be restarted, switching a user terminal connected to the wireless extender to an access point which is performing network communication.

20. A device for automatically restoring connections, including a component for executing the steps of the method according to claim 8.

* * * * *